United States Patent
Caillau et al.

(10) Patent No.: US 6,895,436 B1
(45) Date of Patent: May 17, 2005

(54) METHOD AND SYSTEM FOR EVALUATING NETWORK SECURITY

(75) Inventors: Olivier Caillau, St Laurent du Var (FR); Olivier Daude, Nice (FR)

(73) Assignee: International Business Machines Corporation, Armonk, NY (US)

(*) Notice: Subject to any disclaimer, the term of this patent is extended or adjusted under 35 U.S.C. 154(b) by 685 days.

(21) Appl. No.: 09/607,088

(22) Filed: Jun. 29, 2000

(30) Foreign Application Priority Data

Jul. 1, 1999 (EP) .......................................... 99480052

(51) Int. Cl.$^7$ .......................................... G06F 15/173
(52) U.S. Cl. ........................ 709/224; 709/223; 709/250
(58) Field of Search ............................... 709/223–225, 709/218–221, 226, 250, 200, 201, 213

(56) References Cited

U.S. PATENT DOCUMENTS

| | | | | |
|---|---|---|---|---|
| 5,185,860 A | * | 2/1993 | Wu | 709/224 |
| 5,805,801 A | * | 9/1998 | Holloway et al. | 713/201 |
| 5,907,696 A | * | 5/1999 | Stilwell et al. | 703/13 |
| 6,044,468 A | * | 3/2000 | Osmond | 713/201 |
| 6,205,552 B1 | * | 3/2001 | Fudge | 713/201 |
| 6,282,546 B1 | * | 8/2001 | Gleichauf et al. | 707/102 |
| 6,393,478 B1 | * | 5/2002 | Bahlmann | 709/224 |
| 6,502,193 B1 | * | 12/2002 | Barber | 713/201 |

FOREIGN PATENT DOCUMENTS

EP 455402 11/1991

OTHER PUBLICATIONS

Request for Comments (rfc1155), 20 pp.
Request for Comments (rfc 1212), 17 pp.
Request for Comments (rfc 1213), 62 pp.
Request for Comments (rfc1157), 32 pp.

* cited by examiner

*Primary Examiner*—Ario Etienne
*Assistant Examiner*—Hussein A El-chanti
(74) *Attorney, Agent, or Firm*—John R. Pivnichny; David R. Irvin; Winstead, Sechrest & Minick (57) ABSTRACT

A method for automatically identifying from an ordinary station connected to a TCP/IP network, the network components managed by a network management station for which it is possible to read or write over the confidential network data they store. Starting from the list of the default passwords protecting the network data and the IP addresses of the network components communicating with the ordinary station, the method allows by repeating the IP address discovery process, to discover step by step the passwords used in all the network components managed by the network management station and try to use them in reading or writing network information.

The method allows detecting the lack of protection by password which usually occurs in campus networks and thus auditing such networks against intrusion from one of the stations of the network.

30 Claims, 8 Drawing Sheets

Check if that station is piratable

METHOD AND SYSTEM FOR EVALUATING NETWORK SECURITY

TECHNICAL FIELD

This invention relates to network security in campus networks; more particularly the invention relates to tracking of failures in the implementation of security when defining the agents managed by a network management station.

BACKGROUND INFORMATION

The network management applications, operating on network management workstations, remotely control the various network components. The network components are defined as agents and keep available for use by the network manager information defining the configuration, performance and connection statistics etc . . . These data may represent strategic information for the organizations using this network and must not be pirated. Furthermore, with pirated authorizations, one can modify the network which may result in serious consequences on user data validity.

Network management protocols allow collection by a designated network management station of network information provided by network agents operating on each managed network component. Some network management protocols such as SNMP (Simple Network Management Protocol, RFC 1157 and RFC 1155) are "connection-less" between the network manager station and the network agents hosted by the managed network components. SNMP is based on a "client-server" model allowing any station of the network to act as a network manager (the client) for requesting network information to any network management agent acting as a server. This allows intrusions of one ordinary station into the network management process. In order to counterbalance that lack of security, the protocol uses a password to protect the access to network management data stored on the network components by their SNMP agents. For instance, with SNMP V1 and V2, a specific secret 'Community Name' is associated to each managed TCP/IP network component; this assignment of Community Names is performed by the network administrator when configuring the network agents from the network management station or from network components themselves. In a secure network, to access network management information stored on a network component, one must know the secret Community Name which is associated with this component. When a specific name is not assigned at definition of the network agents, a default name is provided such as 'public'. In a secure network, one can also use the access-control mechanism, by defining, on each network component, a list of IP addresses allowed to issue SNMP requests for the component. But even that access-control mechanism may not be available on some network components.

As a whole, the password security rules are usually well followed against piracy on the WAN (wide Area Networks) outside of the campus network composed of bridged (or switched) and routed LANs (Local Area Networks) but they are not always followed inside the campus network itself; consequently, these networks are not prevented against intrusion from one ordinary station inside the campus network and there is a need for auditing such networks.

European patent application, EP455402 of Hewlett Packard Company, as well as the U.S. Pat. No. 5,185,860, provide a way for automatically discovering all the nodes of a network by using the information stored by the SNMP agents of the network. This information is stored as variables in the MIBS (Management Information Base, RFC 1212 and 1213). Some MIBs are standard other are private, depending on the device manufacturer. Relying on the architecture of networks formed of LANs, hubs and bridges merging subnetworks together, these patents provide a way to use the SNMP information to discover, from the corresponding SNMP network management station, secret community name(s), which are the SNMP security passwords, of all the components of the network hosting an SNMP agent.

There is a need for a tool operating on an ordinary station of a network able to detect if the network information provided by the network components hosting an SNMP agent, can be accessed by another ordinary station. Particularly this tool should apply to campus networks comprising not only bridged or switched LANs but also routed LANs. This tool needs also to be run on a spy station, which must be an ordinary station and not the network management station; this means that the secret Community Names defined by the SNMP agents are not known.

SUMMARY OF THE INVENTION

It is therefore an object of the present invention to detect if it is possible to have a read and/or write access to the network information provided by the SNMP agents of an SNMP managed campus network.

It is a further object of the invention to have this detection performed automatically from any ordinary station connected to the campus network.

These objects are achieved with the method as claimed in claim 1 and the dependent claims.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other objects, aspects and advantages will be better understood from the following detailed description of a preferred embodiment of the invention with reference to the drawings in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 7:
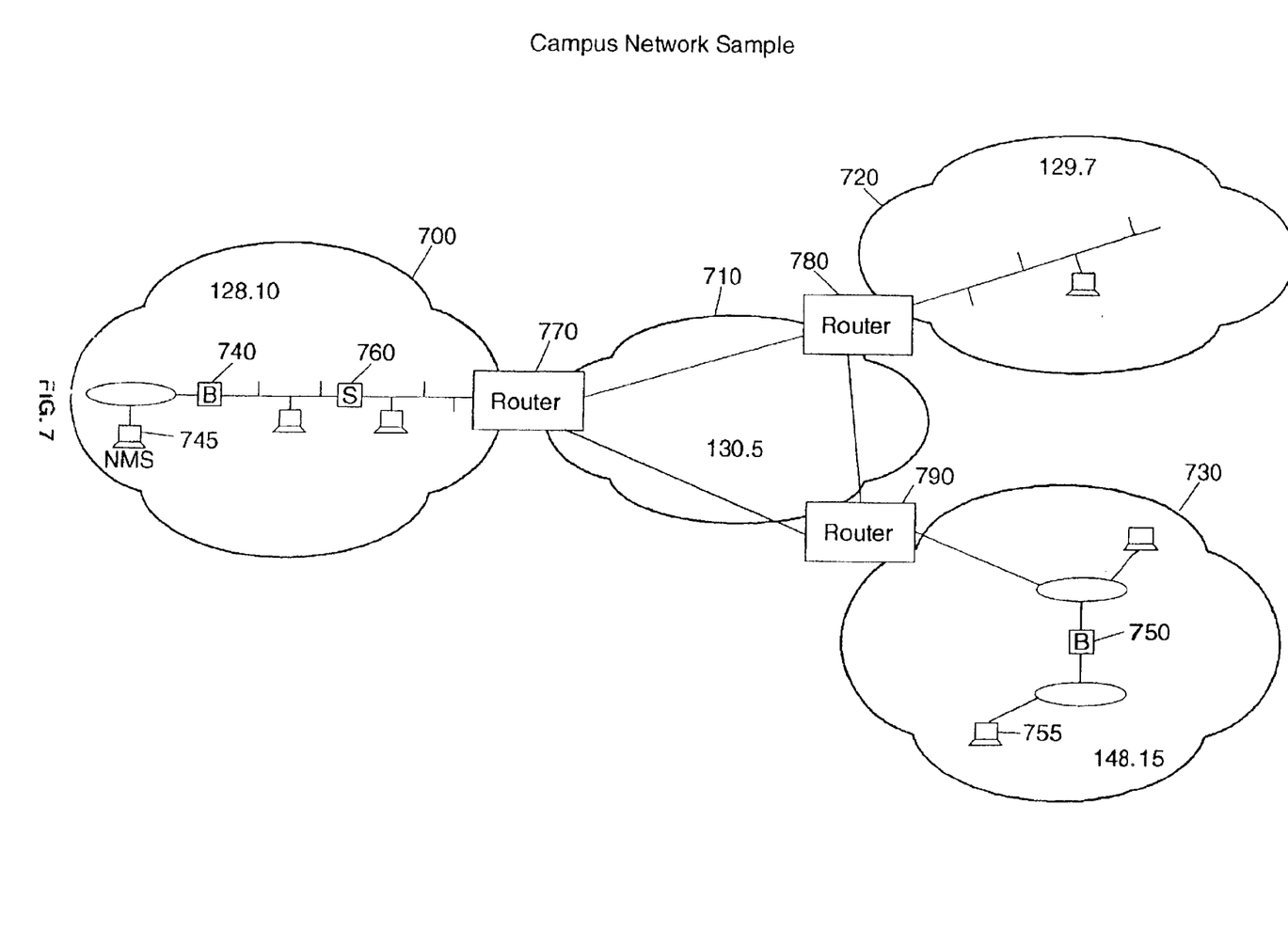
FIG. 7 shows a general view of a network to be checked for intrusion.

In one embodiment, the method can be implemented as a Korn shell operating on a RISC/6000 station attached to a campus TCP/IP network managed by SNMP, the RISC/6000 station is being different from the SNMP network management station. FIG. 7 illustrates such a configuration where TCP/IP subnetworks (700, 710, 720, 730) have the respective IP subnetwork addresses 128.10, 130.5, 129.7, 148.15. The subnetworks contain LANs connected via bridges (740, 750), switches (760) and routers (770, 780, 790). The SNMP agents or PROXYs of the network are managed from the SNMP network management workstation, NMS, (745) belonging to the subnetwork 128. 10. On a spy station, S (755), which is an ordinary station belonging to the subnetwork 148.15, operates the application implementing the method of the preferred embodiment. From this station will be discovered and analyzed the SNMP managed network devices, starting from the devices of the subnetwork of the spy station and further crossing the bridges, switches and routers to reach the other TCP/IP subnetworks.

Figure 1A:
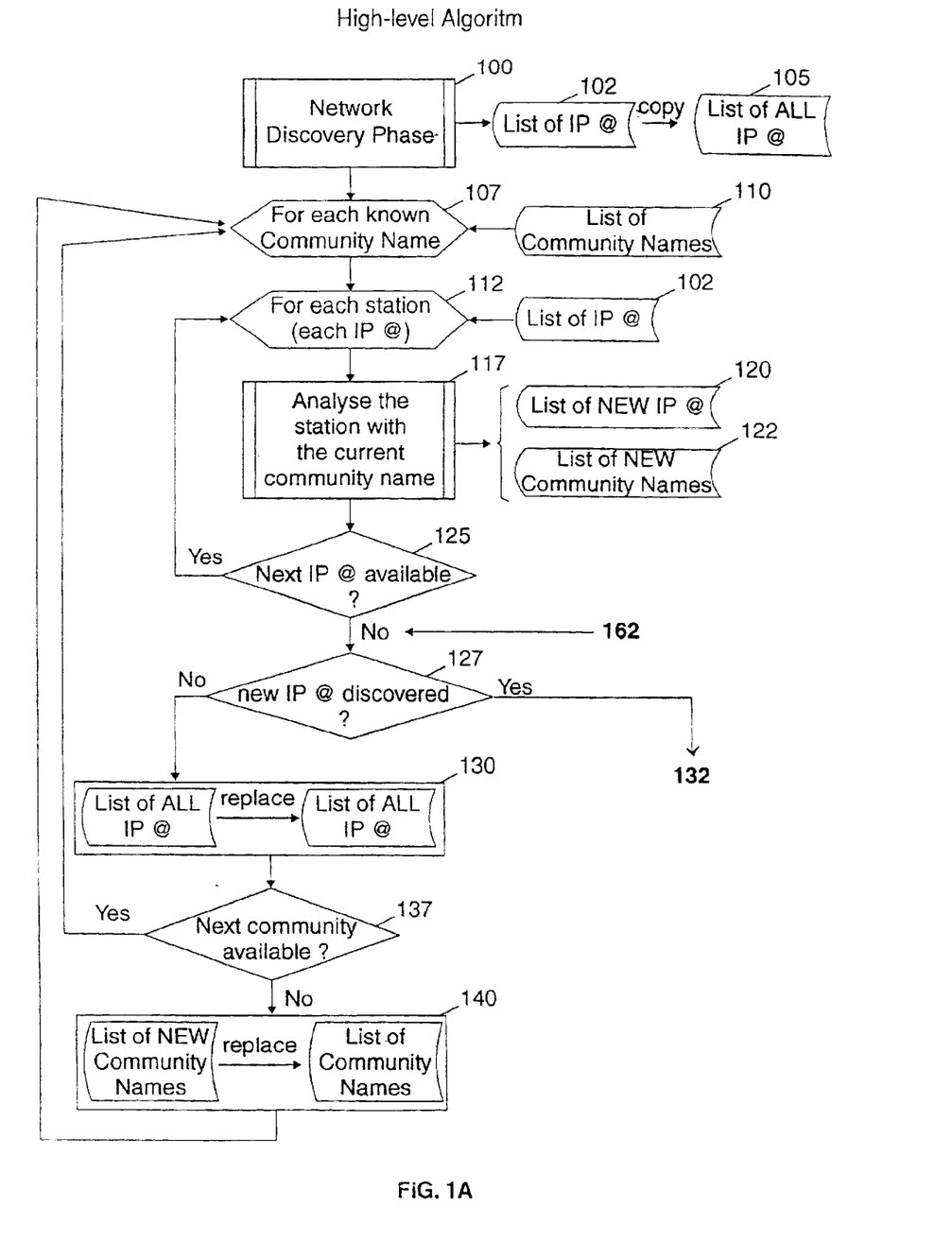
FIG. 1A, FIG. 1B show the high level flowchart supporting the method according to the present invention.

Referring to FIG. 1A, there is shown the high level algorithm of the preferred embodiment of the invention. A first step (100) consists in discovering, from a station connected to a TCP/IP network to be audited, all the IP addresses (102) of the network components managed by an SNMP network management station. The list of all the IP addresses of the network reflects the current map of the network. The following steps of the method described in the flow chart of FIG. 1 aim at discovering more and more network components and to try to access them via the SNMP protocol in read or write mode. As a result of this method are obtained a list of the IP addresses corresponding to the map of the network and accessible subnetworks, a list of the network components which are 'piratable, in write mode, and a list of the Community.

Names used in the network. The next step consists in using one Community Name (107) from a pre-established best guess list (110) of Community Names (the first known Community Names being 'public', 'private', Irmon' and ladmin'), to access each station (112) of the list of IP addresses (102) established in the preceding step.

For each station, the analyzing step (117) is for analyzing the data which can be accessed using the current Community Name. This step is repeated until all the IP addresses have been investigated (answer No to test 125). As a result of the repeated analyzing steps, new IP addresses stored by the accessed station are discovered; an output to this step is thus provided, when available, new IP addresses (120). If the explored station is a router, this step allows the invention to cross over the router and reach new IP subnetworks. In this analyzing step are also discovered new Community Names (CNs); a list of new Community Names (122) is provided as output.

Figure 1B:
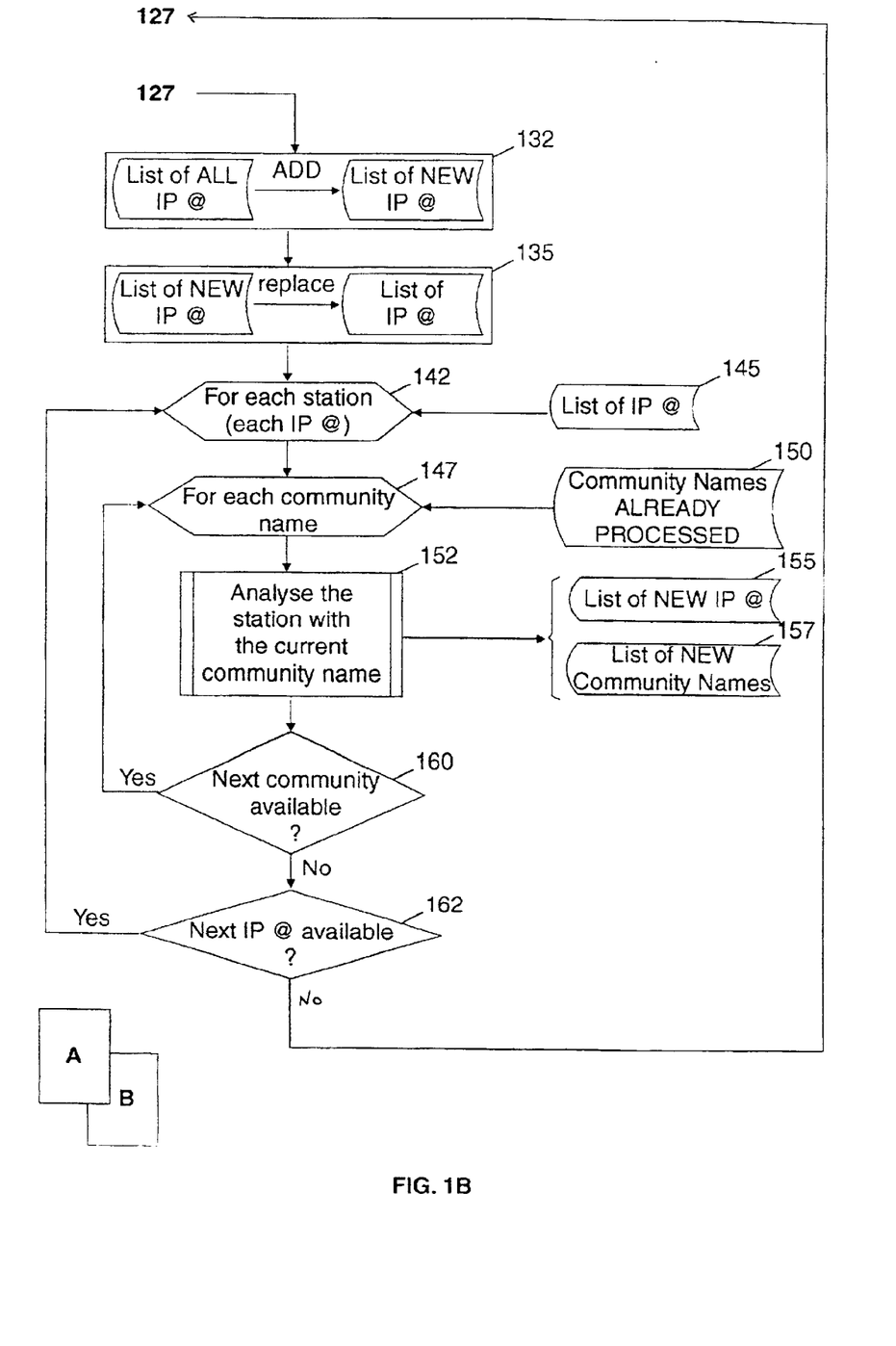

If new IP addresses have been discovered by analyzing a station (117) with the current CN, the answer to test 127 is yes and a new process (32 to FIG. 1B) is performed for analyzing further the new IP stations with the CNs which have been already processed. The part of the general algorithm described in FIG. 1B is part of the preferred embodiment: it avoids reentering the first loop of the general algorithm each time a new IP address is discovered. This optimization is not mandatory and could be suppressed. One other solution would consist in suppressing the algorithm of FIG. 1B and to branch to step 107 instead of step 132 after execution of step 127 in FIG. 1A. In FIG. 1B, the list of new IP addresses are added (132) to the current list of known IP addresses of the network; the next IP addresses to be analyzed being the list of new IP addresses (135) discovered in the preceding step. The same analysis (152, 117) of the station to discover new IP addresses (155) and new CNs (157) is performed for all (answer No to test 162) the new IP addresses (145) and for all (answer No to test 160) the CNs already browsed in the previous steps of the method (150).

Coming back to FIG. 1A, when no new IP addresses are discovered in this step (answer No to test 127), the list of ALL IP addresses filled up at step 132 becomes the current view of the network and replaces the list of the IP addresses of the network to be investigated. The next community name of the list 110 is read and the same double discovery process (117, 152) is performed for the new CN. When all the CNs of the list 110 are processed (answer No to test 137), the same double discovery process (117, 152) is performed again with the list of new CNs (step 140, the new CNs are taken as the new input list).

Figure 2:
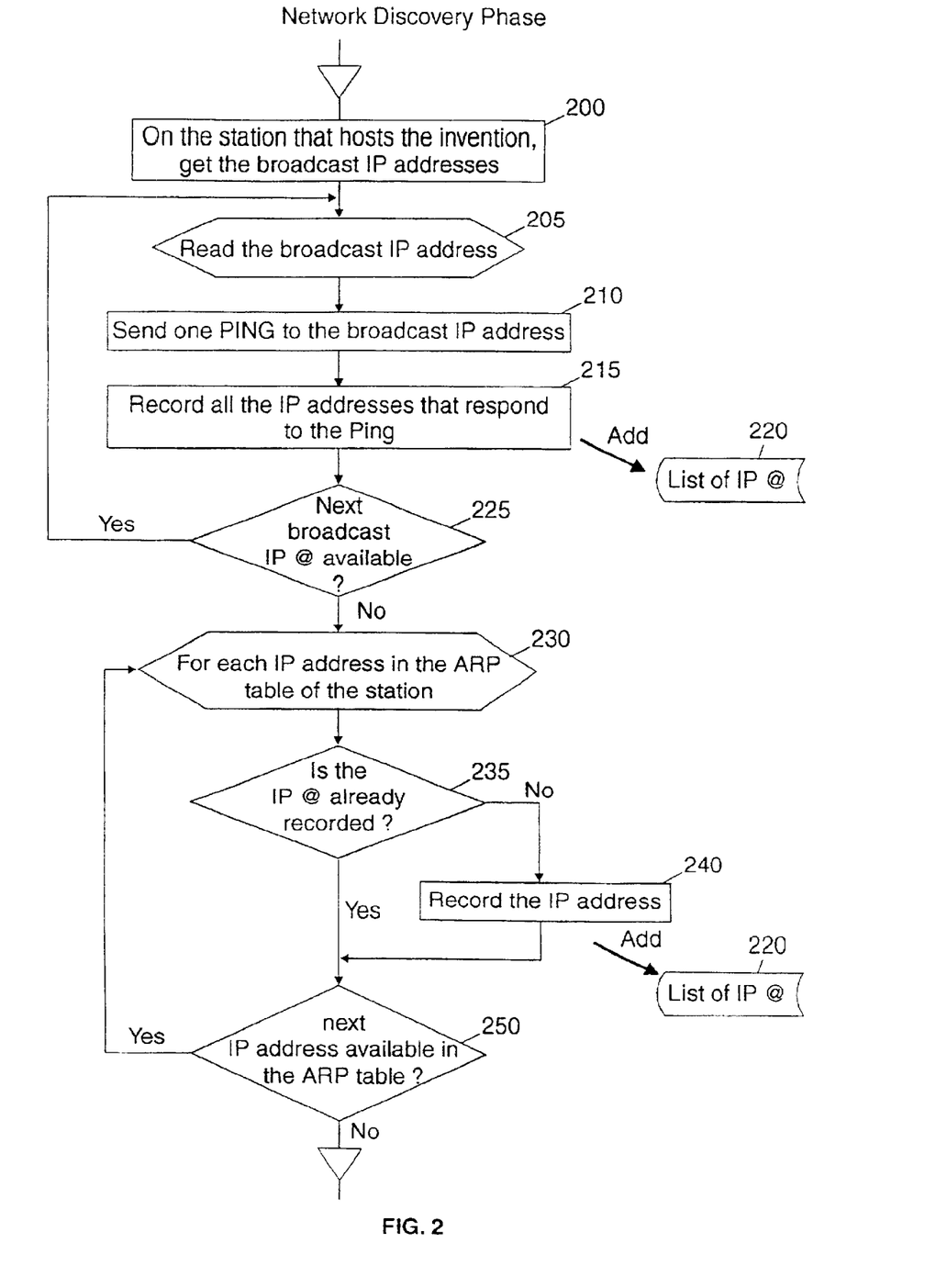
FIG. 2 shows the network discovery phase flowchart which is part of the high level flowchart of FIG. 1.

FIG. 2 describes the network discovery phase (100) mentioned in the general flowchart of FIG. 1. On the 'spy station', which is an ordinary station of the network, the IP broadcast addresses are extracted (200) using operating system commands available to any user of the station. The extraction is performed either by computing the broadcast IP address after reading the IP address and the subnet mask for each IP interface, or by reading the TCP/IP stack configuration file.

In the preferred embodiment running on a Korn shell, all IP interfaces are listed with the "lsdev" system command, then the corresponding broadcast IP addresses are obtained using the "ifconfig" system command. The addresses are contacted (210) via the PING function of the TCP/IP protocol. Each time an address answers, this means that it is accessible from that ordinary station executing the algorithm. This contacted IP address is then stored (215) in a list of IP addresses (220, 102). Sending one PING packet is enough, provided that the PING does not ends immediately. Indeed, when the PING stays alive longer (one minute), it keeps receiving answers, and reports all these duplicate answers with their discovered remote IP address. That behavior is enabled by using the "interval" option of PING (one can redefine the interval, in seconds, between each sent PING packet; by default, it is one second; in the preferred embodiment, it is set to one minute). Before the said time interval expires, the invention stops the PING process.

These steps (205, 210, 215) are performed until all the broadcast IP addresses have been contacted (answer No to test 225). In the following steps (230, 235, 240, 260) the Address Resolution Protocol (ARP) table stored in the ordinary station executing the method is read, using operating system commands, in order to discover new IP addresses in the network; the ARP table stored in the TCP/IP devices contains the couples of IP addresses and Physical addresses of network elements this device is communicating with. The IP addresses stored in the ARP table of the station are read and, if this address is not already known from the preceding steps (answer No to test 235), this address is added (240) to the list of IP addresses discovered (220) until all the addresses of the ARP table have been read (answer No to test 250).

Figure 3:
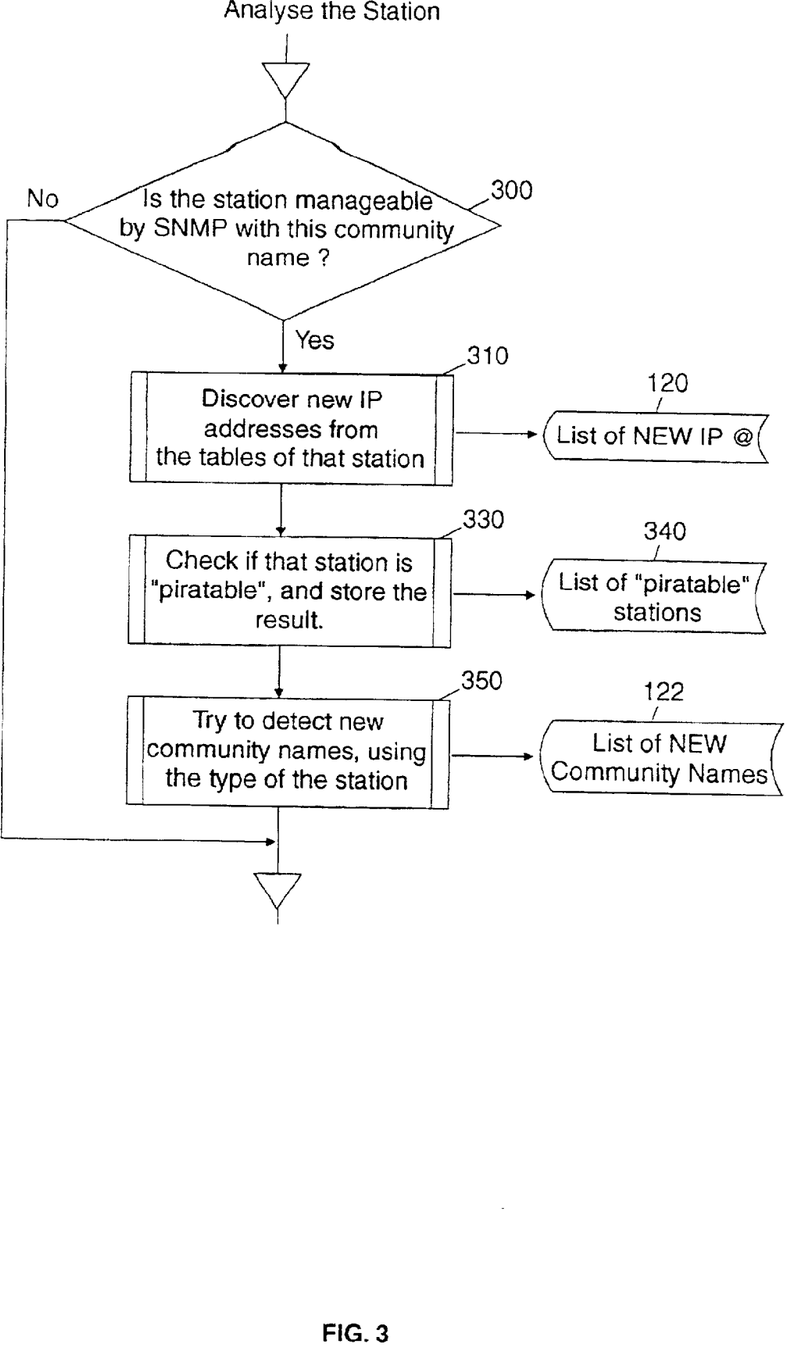
FIG. 3 shows the flowchart of the analysis of a discovered station which is part of the high level flowchart of FIG. 1

In FIG. 3 is provided the detailed flowchart of the repetitive steps of analyzing each station with the current community name (117, 152), already referred in FIG. 1. In input to this process are provided the current Community Name read from the list of Community Names (110) and one IP address from the list of IP addresses (102) constituted during the discovery step (100) which can have been completed by the second analyzing step (152) of the high level flow chart. This process applies to all IP addresses discovered, whether or not they are SNMP-manageable. When a station or device replies to the SNMP GET-NEXT message querying a standard variable like sysObjectID, it means that it is running an SNMP Agent or Proxy Agent. The standard variable chosen, sysobjectId, is part of MIB II, a standard MIB supported by all the device manufacturers, is always provided by the SNMP agents. If the station or device replies (answer yes to test 300), that station can be analyzed and the first step consists in reading, using the SNMP protocol, MIB II tables stored by the station to get the new IP addresses; if new IP addresses are found in the tables read (310), they are stored in a list of new IP addresses (120) already mentioned in the high level flowchart of FIG. 1.

Figure 4:
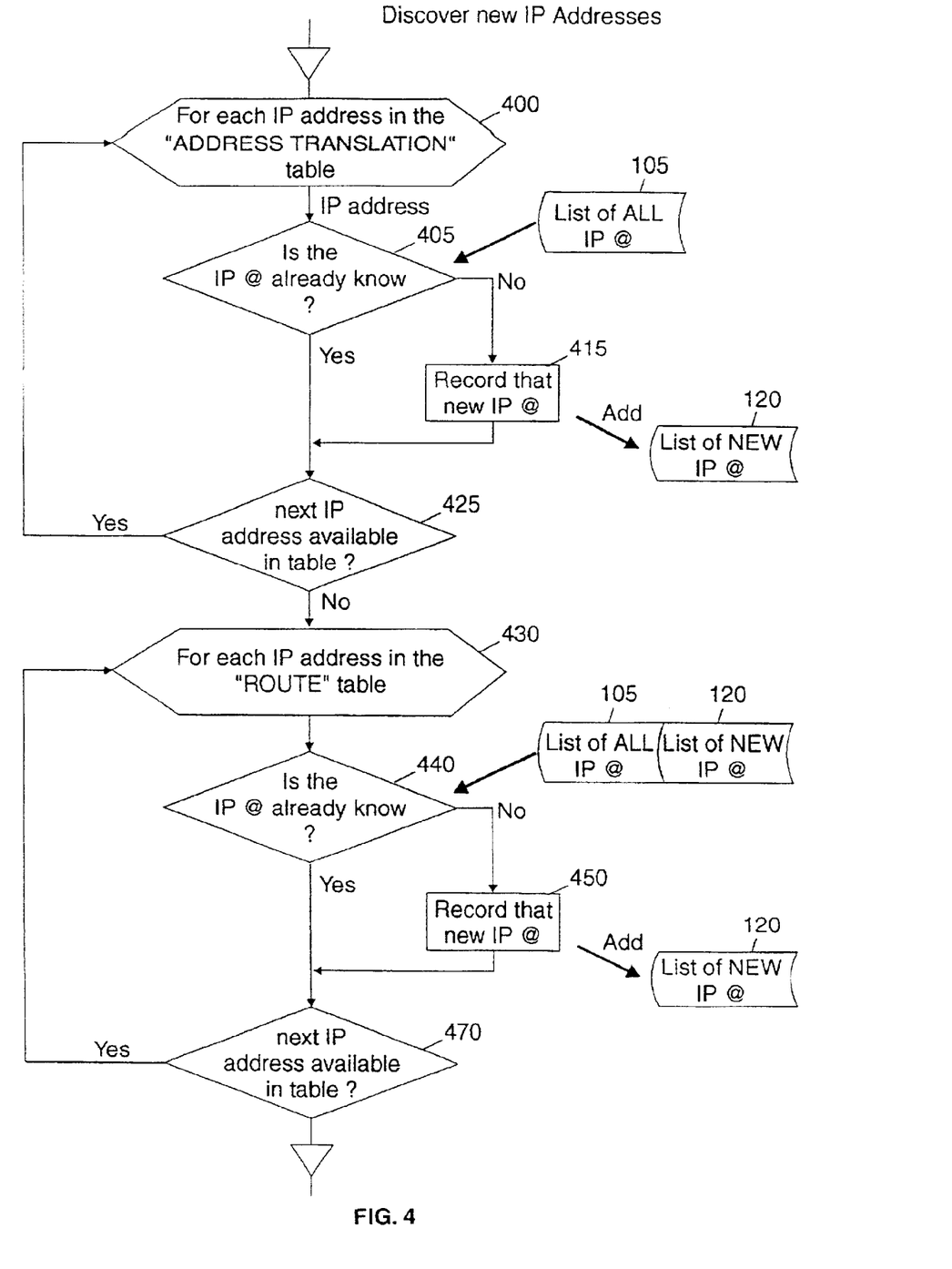
FIG. 4 shows the flowchart of the process of discovery of new IP addresses which is part of the high level flowchart of FIG. 1.

The step of 'discovering new IP addresses' (310) by reading the tables stored in the analyzed station is illustrated with the detailed flowchart of FIG. 4. Compared with FIG. 2, where the IP addresses discovery is performed on the local "spy station", the discovery, which algorithm is described in FIG. 4, is done on the newly discovered station. The first step (400) consists in reading, with the operating system commands, the Address Translation table of the analyzed station, using the SNMP GET-NEXT messages; this table in the MIB-II corresponds to the TCP/IP ARP table already used for the 'network discovery phase' of FIG. 2. The IP addresses are read in the table, and if one of them is not known (answer No to test 405) compared to the already known addresses (105), this new IP address is stored (415) in the list of new IP addresses (120). All the IP addresses of the Address Translation table are read (425). Then the Route table is accessed. The route table stored in any TCP/IP device contains an entry for each route currently known by the station. It could be local subnetwork information (default gateway IP address, route to local subnetwork, loop-back) and, when the device is a router, it further contains information for the other subnetwork(s). The IP addresses are read (430) in the table, and if one is not known (answer No to test 440) compared to the already known addresses (105, 120), this new IP address is stored (450) in the list of new IP addresses (120). All the IP addresses of the Route table are read (470). Consequently, the part of the algorithm described in FIG. 4 allows the discovery to "cross" the routers such as (770) of FIG. 7.

Figure 5:
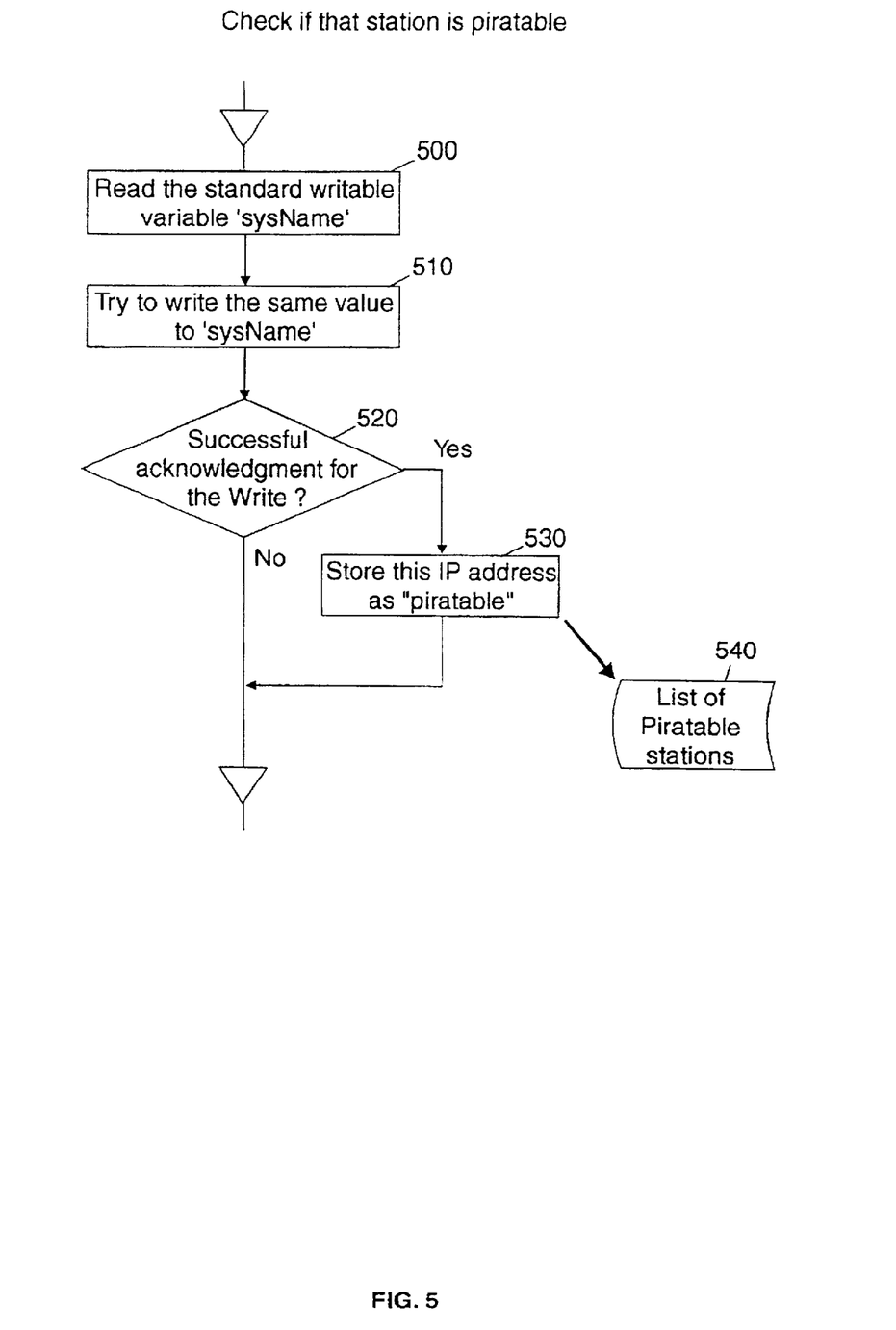
FIG. 5 shows the flowchart of the process of checking if a given station is piratable which is part of the high level flowchart of FIG. 1.

Coming back to FIG. 3, the next step (330) consists in trying to access the station and check if it is 'piratable. The flow chart of this step is illustrated in FIG. 5. The first step consists in reading (500) the standard writeable variable IsysName' which is a standard MIB II variable from the System group: it is the name assigned to the managed node.

The "sysName" is a sample of variable which can be re-written; any other "rewriteable" standard variable provided by the SNMP agents in the System group can also apply to this algorithm and be chosen at this step. The read and write accesses are protected by a Community Name; if these Community Names are discovered, one can access other variables of the MIB. The read operations are performed using SNMP GET NEXT messages. The second step consists in trying to write over this variable (510). If the overwrite is possible (answer yes to test 520), this means that one can modify it and consequently this station is 'piratable'. The write operations are performed using SNMP SET messages. The corresponding IP address of the pirated station is stored (530) in the list of piratable stations (540).

Figure 6:
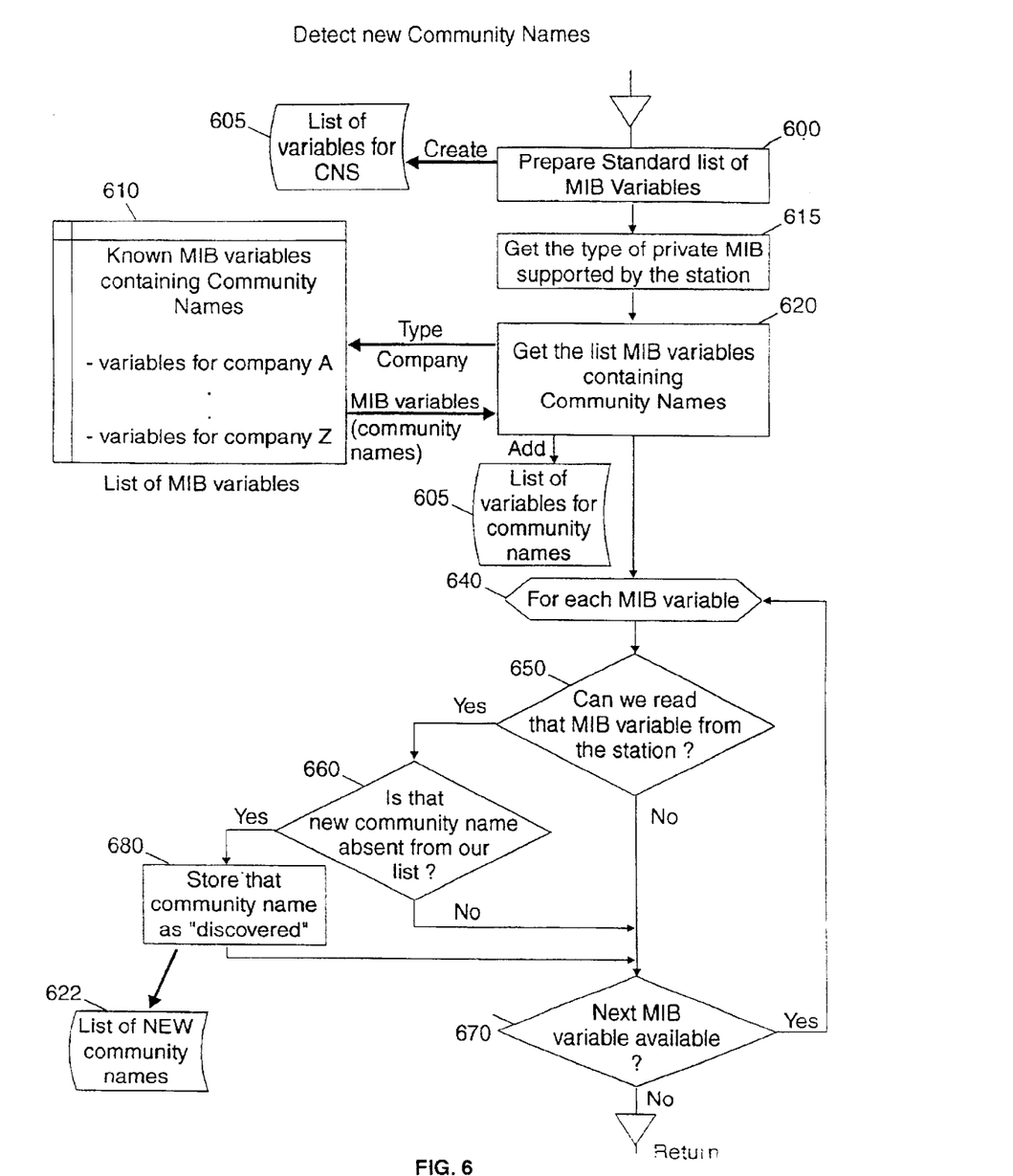
FIG. 6 shows the flowchart of the process of detecting new Community Names which is part of the high level flowchart of FIG. 1.

Coming back to FIG. 3, once the list (340) of piratable stations is established, from the station executing the method, it is also possible to attempt detecting new community names (350) and to store them in a list of new Community Names (122) already referred in the high level flowchart of the method described in FIG. 1. This step of detecting new community names is illustrated with the flow chart of FIG. 6. The first step (600) of FIG. 6 is for creating a list (605) of standard MIB variables that should contain Community Names, like some RMON variables. In the preferred embodiment, one scans the community variables of the Aspen MIB, because that MIB is implemented in many RMON Probes.

Step 615 is for looking at the type of private MIB corresponding to the station analyzed. The unique vendor's authoritative identification of the network management subsystem contained in the analyzed station is retrieved. This is the Isysobjectid'MIB variable already read in the step 300. This value points to a specific private MIB depending on the company manufacturing the corresponding station in a table (610) which has been initialized before operating the algorithm of the method. This table contains a list of MIB variables of the private MIBs corresponding to the different types of device identified in the network. The private company MIBs are public and can be accessed via INTERNET, in the manufacturer WEB sites, for example.

Step 620 is for getting some of the private MIB variables of the station using, as index, the IsysObjectId' variable of the station. The collected MIB variables are those containing a Community Name. The variables read are added to the list of variables containing Community Names (605). As opposed to looking for CN in RMON standard variables in step 600, steps 615, 620 explore private MIB variables depending on device manufacturers. Then each MIB variable of this list (605) is tested (640) to check if it is possible to read its value (650). If it is possible to read it the new Community Name inside it is compared to the list of already known Community Name (660). If a new Community Name is discovered, it is stored (680) in the list of new Community Names (122) and will be used later in a next analyzing, step (117, 152) of the method for further attempt to pirate the network. All the MIB variables of the list (630) are successively explored (670).

While the invention has been described in terms of preferred embodiments, those skilled in the art will recognize that the invention can be practiced with modifications within the spirit and the scope of the appended claims.

Although the present invention and its advantages have been described in detail, it should be understood that various changes, substitutions and alterations can be made herein without departing from the spirit and scope of the invention as defined by the appended claims.

What is claimed is:

1. A method for evaluating network security comprising the steps of:

(a) initializing a list of passwords;

(b) reading network tables stored in network components managed by a network management station and generating a list of network addresses in response thereto;

(c) accessing a network component corresponding to a network address of said list of network addresses, using a password of said list of passwords, and reading one or more additional network addresses from said network component; and (d) updating said list of network addresses in response to said reading of one or more additional network addresses.

2. The method according to claim 1 wherein the tables accessed in step (b) are the broadcast addresses and the Address Resolution Protocol tables.

3. The method according to claim 1 wherein the tables read in step (b) are the address translation table and the routing table.

4. The method of claim 1 further comprising the steps of:

(e) identifying additional passwords included in network management variables stored on said network management and updating said list of passwords with said additional passwords; and (f) identifying if said network component is accessible in write mode.

5. The method according to claim 4 wherein step (f) further comprises the steps of:

reading a standard "rewriteable" network variable stored by said network component; and establishing that said network component is accessible in write mode if said variable can be rewritten.

6. The method according to claim 5 wherein said standard "rewriteable" network variable is sysName.

7. The method according to claim 4 wherein said network management station is an SNMP network management station, and the passwords are Community Names.

8. The method of claim 1 wherein said list of passwords is initialized with the password default values specified at generation of said managed network components.

9. The method of claim 4 wherein step (e) further comprises the steps of:

retrieving a type of private Management Information Base (MIB) supported by said network component;

retrieving a list of private MIB variables containing Community Names;

for each MIB variable of said list of private MIB variables, extracting a corresponding MIB variable content; and if the Community Name is not known, adding the Community Name to a list of Community Names.

10. The method according to claim 4 further comprising the step of, for each password of said list of passwords, repeating said steps (c)–(f).

11. A computer program product embodied in a tangible storage medium, the program product including a program of instructions for performing the steps of:

(a) initializing a list of passwords;

(b) reading network tables stored in network components managed by a network management station and generating a list of network addresses in response thereto;

(c) accessing a network component corresponding to a network address of said list of network addresses, using a password of said list of passwords, and reading one or more additional network addresses from said network component; and (d) updating said list of network addresses in response to said reading of one or more additional network addresses.

12. The program product of claim 11 wherein the tables read in step (b) are the broadcast addresses and the Address Resolution Protocol tables.

13. The program product of claim 11 wherein the tables read in step (b) are the address translation table and the routing table.

14. The program product of claim 11 further comprising the steps of:

(e) identifying additional passwords included in network management variables stored on said network management and updating said list of passwords with said additional passwords; and (f) identifying if said network component is accessible in write mode.

15. The program product according to claim 14 wherein step (f) further comprises the steps of:

reading a standard "rewriteable" network variable stored by said network component; and establishing that said network component is accessible in write mode if said variable can be rewritten.

16. The program product according to claim 15 wherein said standard "rewriteable" network variable is sysName.

17. The program product according to claim 14 wherein said network management station is an SNMP network management station, and the passwords are Community Names.

18. The program product of claim 11 wherein said list of passwords is initialized with the password default values specified at generation of said managed network components.

19. The program product of claim 14 wherein step (e) further comprises the steps of:

retrieving a type of private Management Information Base (MIB) supported by said network component;

retrieving a list of private MIB variables containing Community Names;

for each MIB variable of said list of private MIB variables, extracting a corresponding MIB variable content; and if the Community Name is not known, adding the Community Name to a list of Community Names.

20. The program product of claim 14 further comprising the step of, for each password of said list of passwords, repeating said steps (c)–(f).

21. A data processing system for evaluating network security comprising:

(a) circuitry operable for initializing a list of passwords;

(b) circuitry operable for reading network tables stored in network components managed by a network management station and generating a list of network addresses in response thereto;

(c) circuitry operable for accessing a network component corresponding to a network address of said list of network addresses, using a password of said list of passwords, and reading one or more additional network addresses from said network component; and (d) circuitry operable for updating said list of network addresses in response to said reading of one or more additional network addresses.

22. The data processing system according to claim 21 wherein the tables accessed in (b) are the broadcast addresses and the Address Resolution Protocol tables.

23. The data processing system according to claim 21 wherein the tables read in (b) are the address translation table and the routing table.

24. The data processing system of claim 21 further comprising:
   (e) circuitry operable for identifying additional passwords included in network management variables stored on said network management and updating said list of passwords with said additional passwords; and
   (f) circuitry operable for identifying if said network component is accessible in write mode.

25. The data processing system according to claim 24 wherein (f) further comprises:
   circuitry operable for reading a standard "rewriteable" network variable stored by said network component; and
   circuitry operable for establishing that said network component is accessible in write mode if said variable can be rewritten.

26. The data processing system according to claim 25 wherein said standard "rewriteable" network variable is sysName.

27. The data processing system according to claim 24 wherein said network management station is an SNMP network management station, and the passwords are Community Names.

28. The data processing system of claim 21 wherein said list of passwords is initialized with the password default values specified at generation of said managed network components.

29. The data processing system of claim 24 wherein (e) further comprises:
   circuitry operable for retrieving a type of private Management Information Base (MIB) supported by said network component;
   circuitry operable for retrieving a list of private MIB variables containing Community Names;
   circuitry operable for each MIB variable of said list of private MIB variables, extracting a corresponding MIB variable content; and
   circuitry operable for, if the Community Name is not known, adding the Community Name to a list of Community Names.

30. The data processing system of claim 24 further comprising circuitry operable for, for each password of said list of passwords, repeating an operation of (c)-(f).

* * * * *